Aug. 17, 1948.   J. WIRGIN   2,447,107
EXTENSION FOR TRIPODS
Filed Jan. 26, 1945
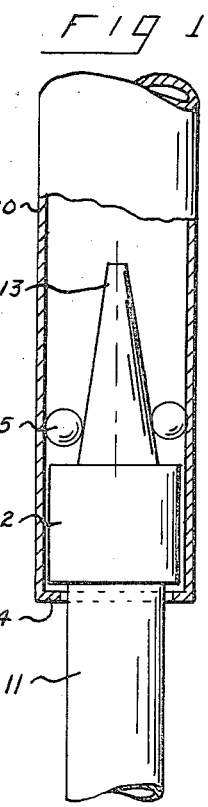
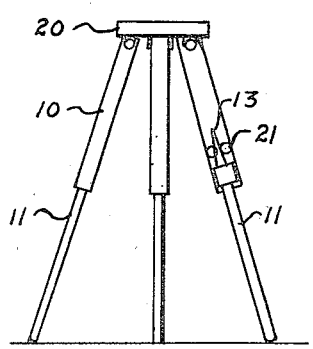
INVENTOR.
JOSEPH WIRGIN
BY Henry M. Wolfson
ATTORNEY Patented Aug. 17, 1948

2,447,107

UNITED STATES PATENT OFFICE 2,447,107

EXTENSION FOR TRIPODS

Joseph Wirgin, Mount Vernon, N. Y.

Application January 26, 1945, Serial No. 574,678

3 Claims. (Cl. 248—191)

This present invention relates to tubular extension standards and more particularly to a means of locking a pair of tubular telescoping members.

In the past there have been a great many attempts to provide an adjustable means for locking tubular telescoping members in a particular position such as on camera tripods or in music stands and various other types of adjustable stands. In most of the former attempts it has been necessary to adjust the telescoping members to a position and then tighten a clamping means. This type of unit is not very satisfactory in use, as the weight on the tripod may force the clamping means to slide or through wear the clamping means become too ineffective.

An object of this invention is to provide a simple, effective, easily constructed member associated with two tubular telescoping members that is effective to lock the two members in relation to each other at any given position.

A further object of this invention is to provide a simple inexpensive locking means within two tubular members to lock the members with relation to each other in any given position.

A still further object of this invention is to provide two tubular telescoping members that will lock when they are in an upright position and will unlock when they are inverted.

Another object and feature of this invention will be found by reference to the accompanying drawing and detailed description in which Fig. 1 is a partial cross-sectional view in elevation of the telescoping members and the locking members, and Fig. 2 is an elevational view of a tripod which may incorporate the details of Fig. 1 in each of the standards.

In one embodiment of the invention illustrated in Fig. 1, there are two telescoping tubular members 10 and 11. The member 11 is formed with an enlarged head member 12 and a cone shaped extension 13. The outer member 10 is formed with a stop shoulder 14 so that the inner radius of the stop shoulder is less than the radius of the head 12, a plurality of balls 15 having a diameter greater than the distance between the base of cone 13 and the inner wall of member 10 are inserted around the periphery of the cone 13. Referring to Fig. 2, there is provided a tripod 20 having the same tubular standards 10 and 11 mounted in the same fashion to provide the telescoping of one member within the other and in which a locking means 21 in the form of a spiral spring is mounted around the periphery of the cone 13. The standards 10 and 11 shown in Fig. 2 are formed with the construction illustrated in Fig. 1.

In use, the telescoping members as illustrated in Fig. 1 or in Fig. 2 will lock in an upright position at any point within the outer telescoping member, due to the force of gravity on the balls 15 or the spring 21 as the case may be and to a force exerted by the outer member 10 causing the balls 15 or the spring 21 to be jammed into the smallest area between the cone 13 and the wall of member 10, thus frictionally gripping both members. The more the force exerted the tighter the locking members will tend to bind. It will be noted that when the standards 10 and 11 are inverted and the force exerted by the outer member 10 is released, by a slight pull of inner member 11, the force of gravity will release the balls 15 as indicated in Fig. 1 or the helical spring 21 as indicated in Fig. 2.

The foregoing description is not intended to limit the present invention which includes all changes and equivalents comprehended within the scope of the appended claims.

What is claimed is:

1. The combination of a pair of tubular standards comprised of two tubular members one telescoping within the other, the inner telescoping member formed with a cone shaped head, a plurality of spheres mounted between the cone shaped head of the one tubular member and the inner wall of the other tubular member providing means to lock the one tubular member with relation to the other tubular member in an upright position and to release said plurality of spheres when in an inverted position by further extension of said standards and gravity, thus permitting complete retelescoping of said tubular standards.

2. The combination of a pair of tubular standards comprised of two tubular members one telescoping within the other, the inner telescoping member formed with a cone shaped head, a helical spring mounted between the cone shaped head of the one member and the inner wall of the other member providing means to lock the one member with relation to the other member in an upright position and to release said helical spring when in an inverted position by further extension of said standards and gravity, thus permitting complete retelescoping of said tubular standards.

3. The combination of a pair of tubular standards comprised of two tubular members one telescoping within the other, the inner telescoping member formed with a cone shaped head, and a locking member between the cone shaped head of the one member and the inner wall of the other member, providing means to lock the one member with relation to the other member in an upright position, and to release said locking member when in an inverted position by further extension of said standards and gravity, thus permitting complete retelescoping of said tubular standards.

JOSEPH WIRGIN.

REFERENCES CITED

The following references are of record in the file of this patent:

UNITED STATES PATENTS

| Number | Name | Date |
|---|---|---|
| 1,620,913 | Orwig | Mar. 15, 1927 |
| 1,769,004 | Turse | July 1, 1930 |

FOREIGN PATENTS

| Number | Country | Date |
|---|---|---|
| 108,311 | Great Britain | Aug. 31, 1939 |
| 336,210 | France | June 15, 1904 |